Oct. 24, 1939.                 T. BRIEGEL                    2,177,091
                            THREAD CUTTING TOOL
                            Filed Sept. 26, 1938
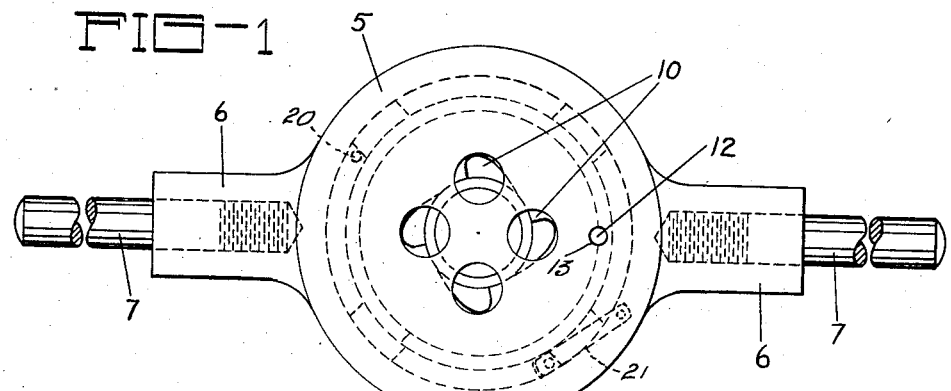
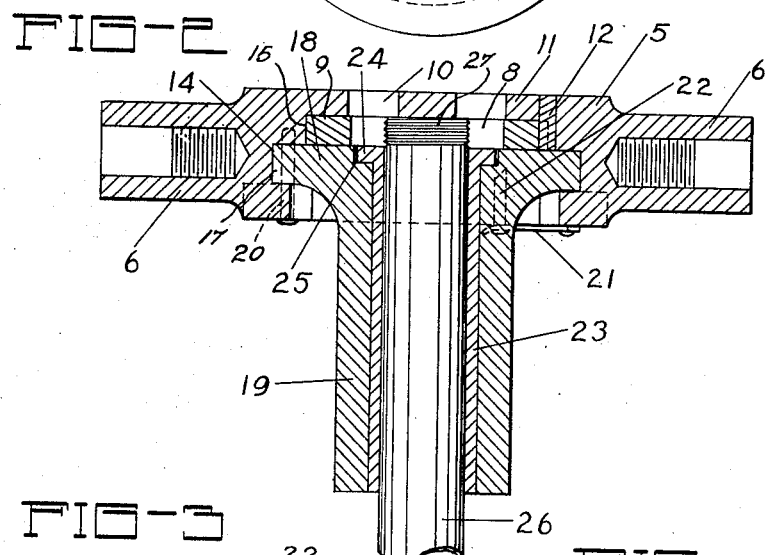
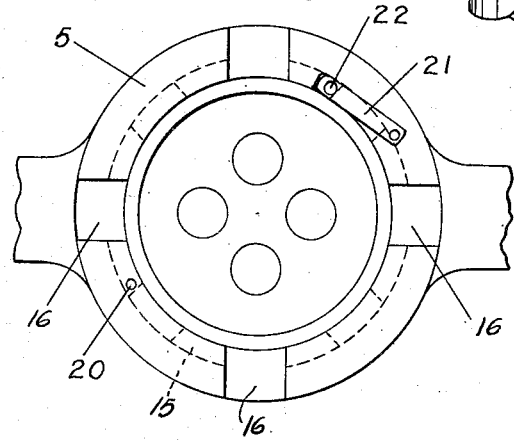 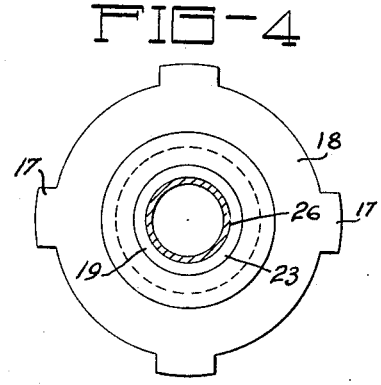
Inventor
Theodore Briegel,
By Walter N. Haskell,
            his Attorney

UNITED STATES PATENT OFFICE 2,177,091

THREAD CUTTING TOOL

Theodore Briegel, Galva, Ill.

Application September 26, 1938, Serial No. 231,691

1 Claim. (Cl. 10—123)

My invention has reference to a thread cutting machine, and has to do more specially with the forming of threads on tubing and pipes of lighter construction. In the present practice the thread is cut for a greater length than required, so that a portion of the tubing which has been weakened by having threads cut therein, and which extends past a point of support, is in danger of bending or breaking at such point. The chief purpose of the present invention is to provide a tool wherein the length of the threaded portion is predetermined, and limited to the special use for which the tube or pipe is intended.

Another purpose of the invention is to provide means for the guidance of pieces of tubing into the tool, and means for adapting the same for use with material of different diameters. The cutting dies are also arranged so as to be removed and replaced by others for operation on a tube of stated diameter, and with a variation in the amount of thread cut, if desired.

The above named, and other features and advantages of the invention will more fully appear from the following specification, reference being had to the accompanying drawing, in which;

Fig. 1 is a front view of the invention.

Fig. 2 is a medial longitudinal section thereof.

Fig. 3 is a view from the rear, with some of the parts removed.

Fig. 4 is a detail of the tube guiding devices.

The reference number 5 indicates the circular body portion of a threading tool, provided at opposite sides with sockets 6, in which are held the ends of rods 7, for use as handles in rotating the tool. Within said head is a cavity 8, containing a die 9, of the usual thread-cutting type, the chips and cuttings from which are permitted to escape through openings 10 in the front wall 11 of the head. The die 9 is held from rotating by a pin 12, fixed in the head, and engaging a groove 13 in the periphery of the die. Said pin also serves as a gauge, to properly position different dies that may be used in the tool.

Projected from the cavity 8 is a recess 14, in the inner part of which is an annular channel 15, from which openings 16 extend to the rear wall of the head. Said openings are equidistant from each other, and are adapted to receive lugs 17 on the head 18 of a cylindrical guide member 19. By inserting said lugs in the openings and giving a partial rotation to the guide 19 the lugs are brought to points in the channel 15 where they will be held from release, as indicated in Fig. 3, and the guide 19 will be retained in position, coupled with the body portion 5. A pin 20 against which one of the lugs contacts serves as a stop therefor, and limits the movement of the head 18 in one direction. At the opposite side of the tool there is fixed to the body portion a small spring 21, carrying a latch-pin 22, which drops down in rear of one of the lugs 17, and prevents a return movement thereof. The tool can thereupon be turned in either direction, in the work of forming a series of threads on a piece of tubing or other object.

As shown in Fig. 2, the guide member is shown provided with an extra sleeve 23, provided on its inner end with an annular flange 24, held in a recess 25 in the head 18. By this means the diameter of the guide can be varied, to receive a piece of tubing of a fixed size, such as is shown at 26, provided on its end with a thread 27. The bores of the guide 19 and sleeve 23 are of predetermined diameters, to provide supporting means and guides for tubing of substantially the same diameter. An additional sleeve of still smaller diameter can be substituted for the sleeve 23 if desired, and other variations can be taken care of by changing the size of the tool.

The dies 9 can also be changed to conform to the diameter of the tube, at such times as the guide member 19 is not in place in the tool. Said guide member can be dislodged by raising the spring 21 and pin 22 and turning the head 18 to a point to permit the passage of the lugs 17 through the openings 16.

It will be noted that movement of the end of the tube 26 inwardly is limited by coming in contact with the front wall 11 of the tool, and that the amount of thread to be cut on the end of the tube is similarly limited, and is no greater than the thickness of the die. The thickness of the die can also be increased by forming the head 18 of thinner metal than is set forth herein.

The piece of tubing shown may be of that kind which is known as "thin wall" tubing, which is more easily weakened by the cutting of threads therein than that of a heavier type, but it is not necessarily limited thereto.

What I claim, and desire to secure, is:

A device of the class described, comprising a body portion including a front plate, a back plate detachably connected therewith, a tubular guide member projecting from said back plate, one or more tubular members adapted for being positioned in said guide member, to receive and guide parts for a threading operation, and thread cutting dies between said plates, the spacing between said plates determining the width of cut on the part presented for threading.

THEODORE BRIEGEL.